US008356394B1

(12) United States Patent
Heinle et al.

(10) Patent No.: US 8,356,394 B1
(45) Date of Patent: Jan. 22, 2013

(54) STANDING VALVE RETRIEVAL TOOL

(76) Inventors: Kent Heinle, Dickinson, ND (US); John Martinson, Dickinson, ND (US); Dale Roller, Dickinson, ND (US)

( * ) Notice: Subject to any disclaimer, the term of this patent is extended or adjusted under 35 U.S.C. 154(b) by 430 days.

(21) Appl. No.: 12/791,741

(22) Filed: Jun. 1, 2010

(51) Int. Cl.
*B23P 19/04* (2006.01)

(52) U.S. Cl. ...... 29/221.6; 29/264; 294/86.1; 294/86.31

(58) Field of Classification Search ................. 29/221.6, 29/264; 294/86.1, 86.3, 86.31, 86.33; 137/515
See application file for complete search history.

(56) References Cited

U.S. PATENT DOCUMENTS 4,017,133 A * 4/1977 Sigler ........................... 220/265
4,349,299 A * 9/1982 Eny ............................ 405/259.6
5,149,163 A * 9/1992 Pruitt ......................... 294/86.31
6,929,024 B1 * 8/2005 Rucker .................... 137/315.41
7,311,346 B2 * 12/2007 Bakke .......................... 294/86.3

* cited by examiner

*Primary Examiner* — Jeanette E Chapman
*Assistant Examiner* — Daniel Kenny
(74) *Attorney, Agent, or Firm* — Neustel Law Offices

(57) ABSTRACT

A standing valve retrieval tool for coupling to a standing valve to allow removal of the standing valve with a tap type puller or a fishing tool. The tool comprises a coupler having a first end and a second end, the first end removably connected to a standing valve within a downhole pump barrel and the second end oriented towards a movable downhole assembly also located within the downhole pump barrel above the standing valve. The coupler has a threaded opening extending within the second end for optionally receiving a tap type puller connector to remove the standing valve and a laterally projecting collar located along the second end for optionally receiving a fishing tool connector to remove the standing valve. The coupler also includes drainage openings extending through the second end for draining debris within the fluid to prevent the threaded opening from becoming plugged.

20 Claims, 7 Drawing Sheets

STANDING VALVE RETRIEVAL TOOL

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an oil well tubing assembly and more specifically it relates to a standing valve retrieval tool for efficiently coupling to a standing valve to allow removal of the standing valve with a tap type puller or a fishing tool.

2. Description of the Related Art

Any discussion of the related art throughout the specification should in no way be considered as an admission that such related art is widely known or forms part of common general knowledge in the field.

Standing valves in oil well assemblies have been in use for years and are typically comprised of a fixed ball-and-seat valve at the lower end of the working barrel of a sucker rod pump. The standing valves works with a movable travelling valve within the barrel to allow fluid, such as oil, to enter the barrel during an upstroke of the travelling valve and to prevent the fluid from exiting through the lower end of the barrel, but force the fluid upwards through the barrel during a down stroke of the travelling valve.

Occasionally, it becomes necessary to remove and check the standing valve; however because of current ineffective attachments used to connect to the standing valve and pull the standing valve up through the barrel for inspection, the removal process can often be difficult and time consuming. If the standing valve cannot be removed via the threadable attachments because of threaded holes being plugged, threads damaged, etc., the operator must generally pull the barrel out of the well that is full of fluid which can lead to a substantial loss of fluid and time. Because of the inherent problems with the related art, there is a need for a new and improved standing valve retrieval tool for efficiently coupling to a standing valve to allow removal of the standing valve with a tap type puller or a fishing tool.

BRIEF SUMMARY OF THE INVENTION

A system for efficiently coupling to a standing valve to allow removal of the standing valve with a tap type puller or a fishing tool. The invention generally relates to an oil well tubing assembly which includes a coupler having a first end and a second end, the first end removably connected to a standing valve within a downhole pump barrel and the second end oriented towards a movable downhole assembly also located within the downhole pump barrel above the standing valve. The coupler has a threaded opening extending within the second end for optionally receiving a tap type puller connector to remove the standing valve and a laterally projecting collar located along the second end for optionally receiving a fishing tool connector to remove the standing valve. The coupler also includes drainage openings extending through the second end for draining debris within the fluid to prevent the threaded opening from becoming plugged.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Figure 1:
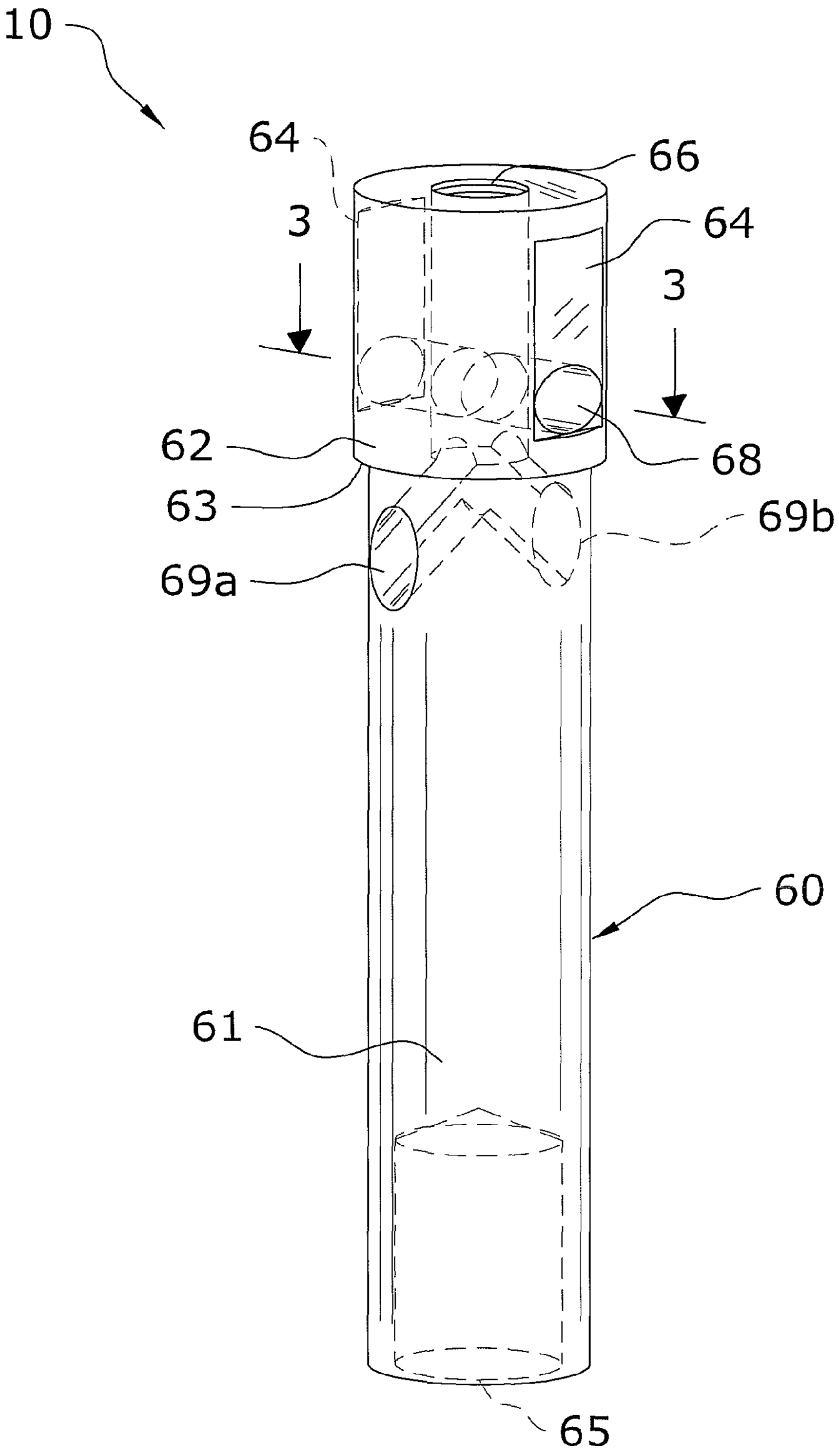
FIG. 1 is an upper perspective view of the coupler.
Figure 2:
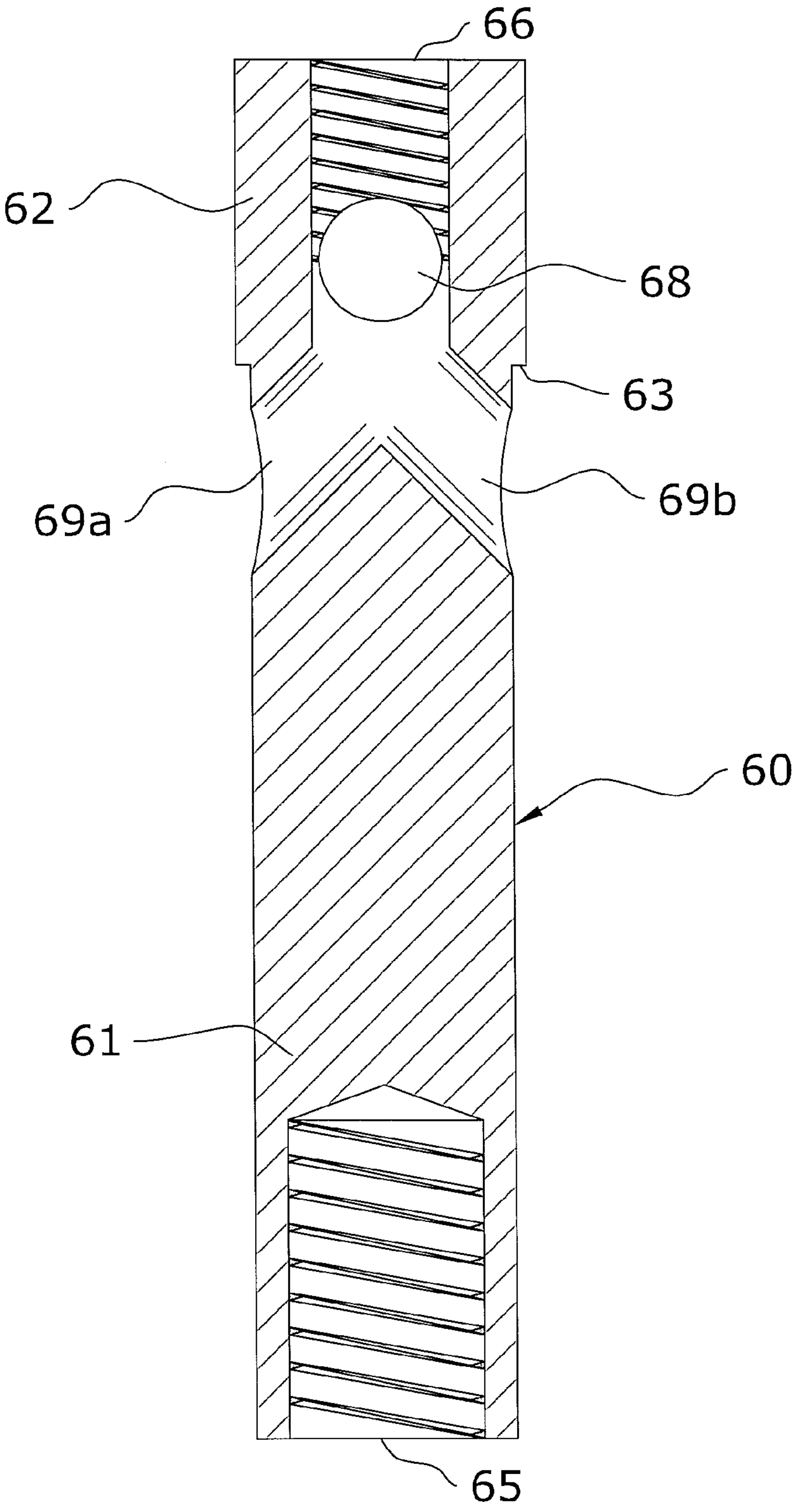
FIG. 2 is a side sectional view of the coupler.
Figure 3:
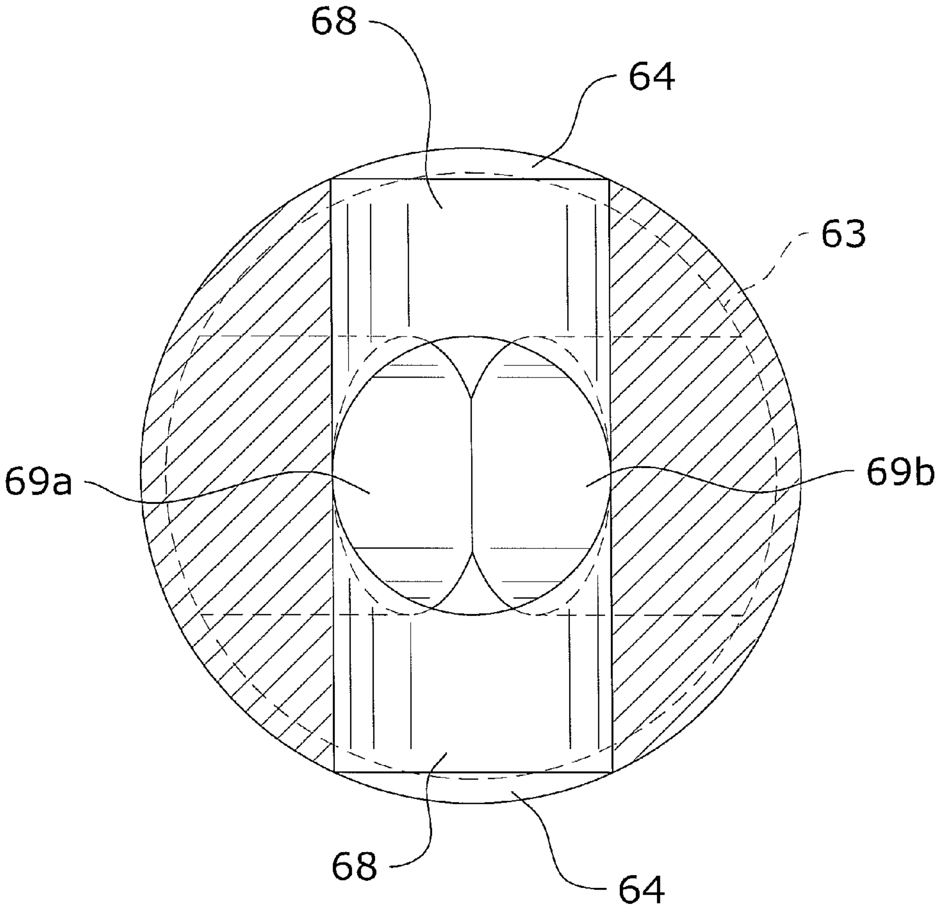
FIG. 3 is a sectional view taken along lines 3-3 of FIG. 1.
Figure 4:
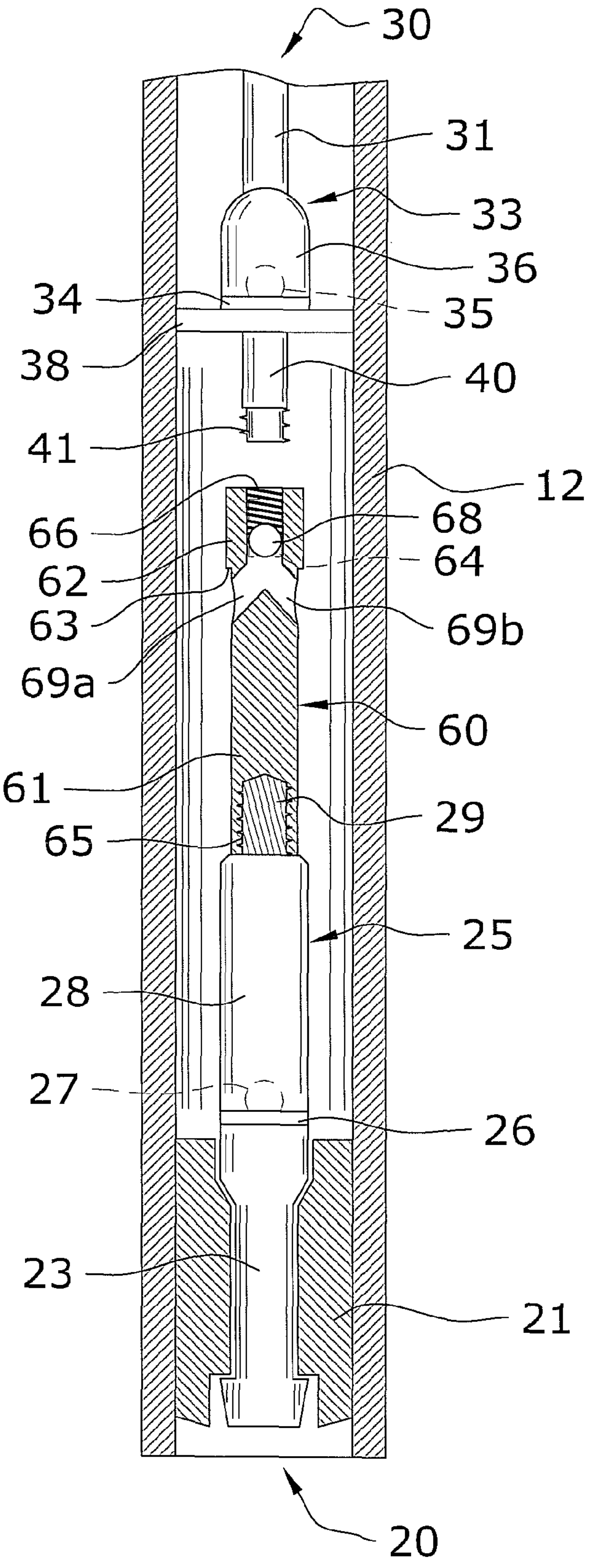
FIG. 4 is a side partial sectional view of the present invention attached within a pump barrel showing the coupler aligned with a first threaded connector.
Figure 5:
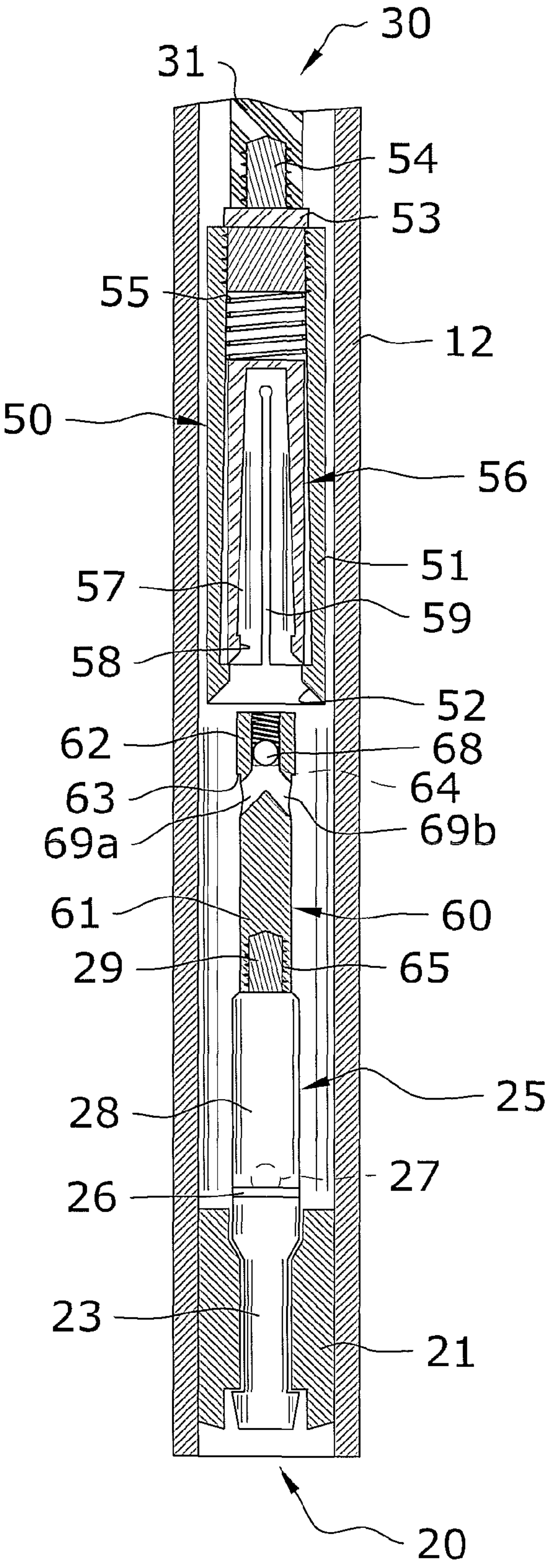
FIG. 5 is a side partial sectional view of the present invention attached within a pump barrel showing the coupler aligned with a second grapple connector.
Figure 6:
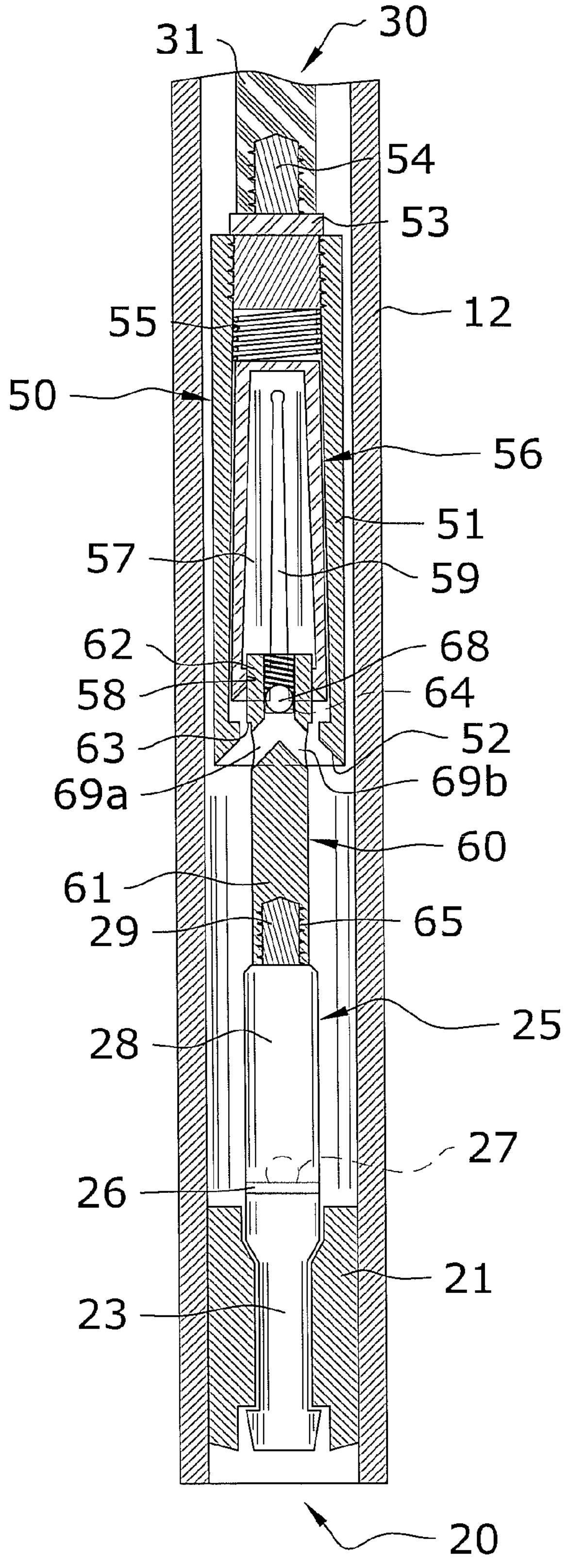
FIG. 6 is a side partial sectional view of the present invention attached within a pump barrel showing the coupler aligned with a second grapple connector and the grappler moving downwards over the upper portion of the coupler.
Figure 7:
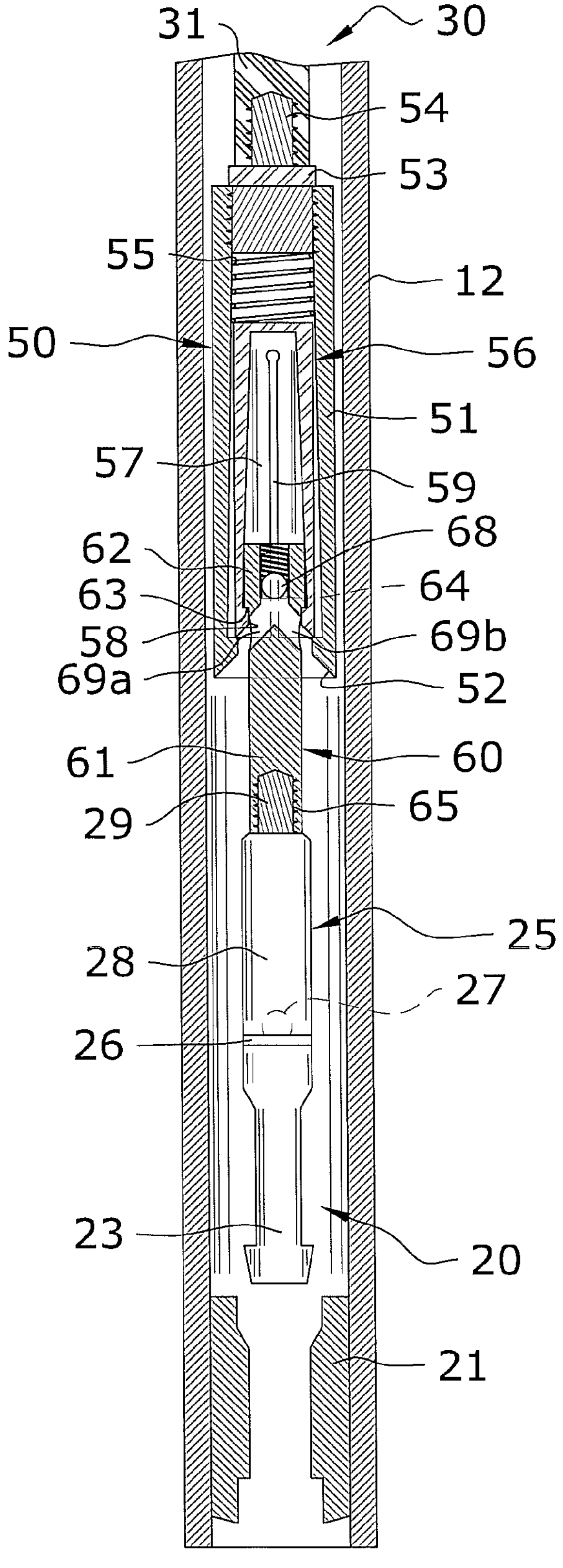
FIG. 7 is a side partial sectional view of the present invention attached within a pump barrel showing the coupler attached to the coupler and pulling the coupler and standing valve upwards within the pump barrel.

Turning now descriptively to the drawings, in which similar reference characters denote similar elements throughout the several views, FIGS. 1 through 7 illustrate a standing valve retrieval tool 10, which comprises a coupler 60 having a first end and a second end, the first end removably connected to a standing valve 25 within a downhole pump barrel 12 and the second end oriented towards a movable downhole assembly also located within the downhole pump barrel 12 above the standing valve 25.

The coupler 60 has a threaded opening 66 extending within the second end for optionally receiving a tap type puller connector 40 to remove the standing valve 25 and a laterally projecting collar 62 located along the second end for optionally receiving a fishing tool connector 50 to remove the standing valve 25. The coupler 60 also includes drainage openings 68, 69*a*, 69*b* extending through the second end for draining debris within the fluid to prevent the threaded opening 66 from becoming plugged.

The present invention is generally used with a pumpjack (not shown) to mechanically lift the movable assembly 30 within the downhole pump barrel 12 to pump the fluid, such as oil and gases, to the ground surface. The pumpjack and lifting motion of the movable assembly 30 is conventional with the prior art and is thus not illustrated herein.

B. Standing Valve Assembly.

The standing valve assembly 20 is generally located at the lower end of the downhole pump barrel 12. The standing valve assembly 20 allows fluid to enter the barrel 12 during upward motion of the movable assembly 30 via pressure changes in the pump barrel 12. When the movable assembly 30 travels downward, the standing valve 25 closes so that the fluid is able to travel upwards through the pump barrel 12 to the ground surface.

The standing valve assembly 20 includes a seating nipple 21 at the lower end that is generally fixed within the barrel for holding the lock 23 of the standing valve 25 in a given position. The standing valve 25 generally includes a ball seat 26 engageable by a ball valve 27 operating within a vertically extending cage 28 to selectively allow passage of fluid therethrough depending upon a position and movement of the movable assembly 30. The lock 23 generally extends from a lower end of the ball seat 26 and includes a laterally movable lower end for engaging and disengaging the seating nipple 21, such as is common in the art of standing valves 25 and thus not specifically illustrated herein. The cage 28 and rest of the standing valve 25 may include various openings, channels, or passageways (not shown) for the fluid to travel therethrough.

Preferably extending upwardly from the cage 28 is a post 29 or other connection means for connecting to the coupler 60. The post 29 is preferably comprised of a threaded structure to removably receive the coupler 60; however various other types of connection means may be utilized in place or in addition to the post 29 to connect the coupler 60 to the standing valve 25 for removal of the standing valve 25. The connection means may provide for a fixed connection between the coupler 60 and the standing valve 25 or a removable connection.

C. Movable Assembly.

The movable assembly 30 is generally within the downhole pump barrel 12 above the standing valve 25. The movable assembly 30 allows fluid to enter the barrel 12 during upward motion between the movable assembly 30 and the standing valve 25 and forces the fluid upwards within the barrel 12 when travelling downwards. The movable assembly 30 generally travels vertically within the pump barrel 12 in a constant reciprocating manner as is common in the prior art.

The movable assembly 30 generally includes one or more sucker rods 31 for extending down the pump barrel 12 and mechanically connecting the pumpjack to the travelling valve 33 and plunger 38. Generally extending from the lower end of the lowermost sucker rod 31 is a travelling valve 33 that is adapted to vertically move within the pump barrel 12 along with the sucker rods 31.

Similar to the standing valve 25, the travelling valve 33 generally includes a ball seat 34 engageable by a ball valve 35 operating within a vertically extending cage 36 to selectively allow passage of fluid therethrough depending upon a position and movement of the movable assembly 30. The travelling vale may connect to the end of the sucker rods 31 in various manners, such as via threadble connection, fixed connection, through various interconnecting structures, etc., all which are generally common in the prior art. The cage 36 and rest of the travelling valve 33 may include various openings, channels, or passageways (not shown) for the fluid to travel therethrough.

Extending from a lower end of the travelling valve 33 is generally a plunger 38. It is appreciated that the travelling valve 33 and the plunger 38 may vary in arrangement and structure as is common with prior art.

D. First Connector.

The first type of connector that may be used to remove the standing valve 25 and attached coupler 60 is the tap type puller 40. The first connector 40 generally extends from the lower end of the plunger 38 towards the coupler 60. The first connector 40 may be fixed to the plunger 38 or removably connected through various means, such as threaded, etc. The lower end 41 of the first connector 40 is generally threaded to threadably connect to the coupler 60.

E. Second Connector.

The second type of connector that may be used to remove the standing valve 25 and attached coupler 60 is the fishing tool type 50. The second connector 50 is generally used when the first connector 40 is damaged or will not function properly, such as when the upper opening 66 of the coupler 60 is plugged or damaged. The second connector 50 generally is attached directly to the lower end of the sucker rods 31 via a threadable post 54 being connected to the lower end of the sucker rods 31. When attaching the second connector 50, the travelling valve 33 and plunger 38 are generally removed; however it is appreciated that the second connector 50 may be attached in various alternate manners.

The second connector 50 generally comprises an elongated cylinder 51 (i.e. overshot) having a lower end with an inwardly projecting catch 52 for retaining a grapple 56 within an interior cavity. The lower end is generally open to the interior of the cylinder 51 and the grapple 56 and extends past and below the grapple 56. The upper end of the cylinder 51 is also generally open and threaded to receive a threaded end piece 53 in which the post 54 extends upwardly from for threadably connecting to the sucker rods 31.

The grapple 56 includes a plurality of pivotal fingers 57 each separated by a slot 59 for pivoting over the upper portion 62 of the coupler 60 and grasping the shoulder 63 of the coupler 60 for pulling the coupler 60 and standing valve 25 upwards. Each of the fingers 57 generally include an inwardly projecting catch 58 for extending beneath the shoulder 63 of the upper portion 62 of the coupler 60 to lock upon the coupler 60 during upward movement of the second connector 50. During upward movement of the second connector 50, the catch 52 of the cylinder 51 also catches upon the lower end of the grapple 56 to prevent the grapple 56 from sliding out of the cylinder 51. The inside diameter of the grapple 56 may vary with varying diametric upper portions 62 and lower portions 61 of couplers 60 as appreciated.

The interior edges of the cylinder 51 are generally tapered to force the fingers 57 of the grapple 56 to open slightly when being pushed upwardly via engagement with the upper portion 62 of the coupler 60. A spring 55 is generally located between the upper end of the grapple 56 and the removable end piece 53 for applying downward pressure upon the grapple 56 to push the grapple 56 downwards when the catch 58 of the grapple 56 clears the shoulder 63 thus allowing the fingers 57 to pivot inwardly and the catch 58 to be secured upon the horizontal surface of the shoulder 63. It is appreciated that the second connector 50 may vary in structure as appreciated with other types of fishing tool structures.

F. Coupler.

The coupler 60 is used to interconnect the standing valve 25 to either the first connector 40 or the second connector 50 for removing the standing valve 25 from the pump barrel 12 via upward movement of the first connector 40 or second connector 50 via upward movement of the sucker rods 31 of the movable assembly 30. The coupler 60 is generally left attached to the standing valve 25 at all times so that the standing valve 25 may be removed when desired. The use of the first connector 40 or the second connector 50 may depend on various circumstances, such as availability, convenience, or condition of the respective connector 40, 50 or connecting portion 62, 66 of the coupler 60. The coupler 60 may be comprised of various materials, such as stainless steel, 1045 carbon steel, or other metals and is generally comprised of a one-piece integral structure.

The coupler 60 generally includes a lower portion 61 comprised of a uniform exterior diameter and having a lower opening 65 extending upwardly from a bottom end. The lower opening 65 is generally threaded and receives the post 29 of the standing valve assembly 20 to connect the coupler 60 to the standing valve 25 so that the coupler 60 extends vertically upwards from the standing valve 25.

Extending upwardly from an upper end of the lower portion 61 is the upper portion 62 also deemed the "collar" or "connecting portion" herein. The upper portion 62 extends linearly from the lower portion 61 and is concentric with the lower portion 61. The upper portion 62 has a uniform exterior diameter which is greater than the exterior diameter of the lower portion 61. The length of the upper portion 62 is also generally much shorter than the length of the lower portion 61 to allow for the grapple 56 to extend past the upper portion 62; however it is appreciated that the lengths may be altered in varying embodiments.

The coupler 60 includes a shoulder 63 that is formed between the upper portion 62 and the lower portion 61 and generally extends in a perpendicular manner to the vertical axis of the coupler 60 so that an upwards pulling motion upon the shoulder 63 does not cause the catch 58 of the grapple 56 to slide off of the shoulder 63. The shoulder 63 is further generally comprised of a similar width as the amount that the catch 58 of the grapple 56 extends inwardly from the fingers 57 of the grapple 56 so that the fingers 57 rest substantially flush along the exterior of the upper portion 62 while the inward face of the catch 58 of the grapple 56 rests substantially flush along exterior surface of the lower portion 61.

The upper opening 66 also deemed "connecting portion" herein extends downwardly from a top end of the upper portion 62 for receiving the threaded end 41 of the first connector 40. The upper opening 66 is generally concentric with the upper portion 62.

The coupler 60 also preferably includes a plurality of drainage openings 68, 69*a*, 69*b* for ensuring that the upper opening 66 does not fill with debris or contaminants generally present within the oil fluid being pumped to the ground surface. The drainage openings 68, 69*a*, 69*b* all fluidly interconnect with the upper opening 66 of the coupler 60 and provide a means for the debris to drain from the upper opening 66 out of the coupler 60.

The drainage openings 68, 69*a*, 69*b* generally include a horizontal drainage opening 68 extending in a horizontal manner through the upper portion 62 of the coupler 60 and intersecting at a lower end of the upper opening 66 in a substantial center of the horizontal drainage opening 68. Also generally included are a plurality of diagonal openings 69*a*, 69*b* angularly extending downward from a lower end of the upper opening 66 through the lower end of the upper portion 62 and through an upper end of the lower portion 61 so that the diagonal openings 69*a*, 69*b* exit through an upper end of the exterior surface of the lower portion 61. The diameter of the drainage openings 68, 69*a*, 69*b* may vary as appreciated, all which are suitable for draining debris and contaminants from the upper opening 66 to prevent the debris from settling within the upper opening 66 and plugging the upper opening 66.

The coupler 60 may also include a plurality of depressions 64 within the exterior surface of the upper portion 62 and/or the lower portion 61. The depressions 64 are flat to receive the head of a wrench or pliers tool to threadably tighten the coupler 60 upon the post 29 of the standing valve 25 via rotating the coupler 60. It is appreciated that in alternate embodiments, the coupler 60 may include a post which is threadable within an opening of the standing valve 25 for connection.

G. Operation of Preferred Embodiment.

In use, the coupler 60 is securely attached to the standing valve 25 prior to insertion of the standing valve 25 within the pump barrel 12 and seating nipple 21. When the coupler 60 and standing valve 25 are in use during normal pumping operation, the drainage openings 68, 69*a*, 69*b* preferably prevent any debris from settling within the upper opening 66 via gravity causing the debris to travel through the drainage openings 68, 69*a*, 69*b* to exit the upper opening 66 and coupler 60.

When the standing valve 25 is desired to be removed from the pump barrel 12 for repair, maintenance, or inspection, either the first connector 40 or the second connector 50 may be utilized. If the first connector 40 is used, the threaded end 41 of the first connector 40 is threadably connected within the upper opening 66 of the coupler 60 until taut and upward motion is applied to the sucker rods 31 causing the first connector 40 to pull upward upon the coupler 60 which causes the lock 23 to release from the seating nipple 21 and the standing valve 25 to travel upwards with the sucker rods 31.

If the second connector 50 is used, because of convenience, damage to the threaded end 41 of the first connector 40 or upper opening 66, pluggage of the opening 66, etc., the second connector 50 is connected to the sucker rods 31. Downward movement of the second connector 50 causes the pivotal fingers 57 of the grapple 56 to pivot outwards via movement along the tapered interior edge of the cylinder 51. Once the catch 58 of the grapple 56 clears the upper portion 62 (moves below the upper portion 62), the spring 55 applies a biasing force upon the grapple 56 so that the grapple 56 moves downward and the catch 58 of the grapple 56 moves inward to contact the exterior surface of the lower portion 61 below the shoulder 63. Upward movement of the sucker rods 31 cause the catch 58 of the grapple 56 to apply an upward force upon the shoulder 63 of the coupler 60 which moves the coupler 60 and standing valve 25 upwards via causing the lock 23 to release from the seating nipple 21.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A standing valve retrieval system, comprising:

a standing valve aligned with a downhole pump barrel;

a movable downhole assembly located within said downhole pump barrel above said standing valve;

a coupler having a lower portion and an upper portion, said lower portion removably connected to said standing valve and said upper portion oriented towards said movable downhole assembly;

said upper portion having a threaded opening;

said upper portion laterally projecting outwards with respect to said lower portion; and a connector removably connected to said movable downhole assembly, said connector having a hooked device for grabbing an underside of said upper portion around a perimeter of said lower portion to dislodge said standing valve from said downhole pump barrel via an upward movement of said movable downhole assembly and said coupler.

2. The standing valve retrieval system of claim 1, wherein said lower portion is substantially longer than said upper portion.

3. The standing valve retrieval system of claim 1, wherein said coupler includes a shoulder extending from a first exterior perimeter of said upper portion to a second exterior perimeter of said lower portion.

4. The standing valve retrieval system of claim 3, wherein said shoulder is perpendicular to a vertical axis of said coupler.

5. The standing valve retrieval system of claim 1, wherein said threaded opening is concentric with said upper portion.

6. The standing valve retrieval system of claim 1, wherein said coupler includes a lower opening extending upwards from a bottom end of said coupler.

7. The standing valve retrieval system of claim 6, wherein said lower opening is threaded.

8. The standing valve retrieval system of claim 1, wherein said coupler includes a plurality of depressions extending within an exterior surface of said upper portion.

9. The standing valve retrieval system of claim 1, wherein said plurality of depressions are flat for receiving a tightening tool.

10. The standing valve retrieval system of claim 1, wherein said coupler includes a plurality of drainage openings intersecting with said threaded opening.

11. The standing valve retrieval system of claim 10, wherein said plurality of drainage openings include a horizontally oriented opening.

12. The standing valve retrieval system of claim 11, wherein said horizontally oriented opening extends through said upper portion.

13. The standing valve retrieval system of claim 10, wherein said plurality of drainage openings include a plurality of diagonal openings.

14. The standing valve retrieval system of claim 13, wherein said plurality of diagonal openings extend from said upper portion and through said lower portion.

15. A standing valve retrieval tool, comprising:

a lower portion having a lower end and an upper end;

said lower end of said lower portion having a lower threaded opening extending therein for threaded connection to a standing valve;

said lower portion having a lower exterior diameter;

an upper portion having a lower end and an upper end;

said lower end of said upper portion linearly extending from said upper end of said lower portion;

said upper portion having an upper exterior diameter, wherein said upper exterior diameter is greater than said lower exterior diameter;

said upper end of said upper portion having an upper threaded opening extending therein for threaded connection to a first connector;

a plurality of drainage openings intersecting with said upper threaded opening; and a shoulder defined along said lower end adjacent a peripheral edge of said upper portion, wherein said shoulder is perpendicular to a vertical axis of said upper portion and wherein said shoulder is adapted to retain a second connector thereunder.

16. The standing valve retrieval tool of claim 15, wherein said lower portion is substantially longer than said upper portion.

17. The standing valve retrieval tool of claim 15, including a plurality of depressions extending within an exterior surface of said upper portion.

18. The standing valve retrieval system of claim 15, wherein said plurality of drainage openings include:

a horizontally oriented opening extending through said upper portion; and a plurality of diagonal openings extending from said upper portion and through said lower portion.

19. A standing valve retrieval system, comprising:

a standing valve aligned with a downhole pump barrel;

a movable downhole assembly located within said downhole pump barrel above said standing valve;

a coupler having a lower portion and an upper portion, said lower portion removably connected to said standing valve and said upper portion oriented towards said movable downhole assembly;

said upper portion having a threaded upper opening;

said upper portion laterally projecting outwards with respect to said lower portion;

wherein said lower portion is substantially longer than said upper portion;

wherein said coupler includes a shoulder extending from a first exterior perimeter of said upper portion to a second exterior perimeter of said lower portion;

wherein said shoulder is perpendicular to a vertical axis of said coupler;

wherein said threaded upper opening is concentric with said upper portion;

wherein said coupler includes a threaded lower opening extending upwards from a bottom end of said coupler;

wherein said coupler includes a plurality of depressions extending within an exterior surface of said upper portion;

wherein said plurality of depressions are flat for receiving a tightening tool;

wherein said coupler includes a plurality of drainage openings intersecting with said threaded upper opening;

wherein said plurality of drainage openings include a horizontally oriented opening and wherein said horizontally oriented opening extends through said upper portion;

wherein said plurality of drainage openings include a plurality of diagonal openings and wherein said plurality of diagonal openings extend from said upper portion and through said lower portion;

and a connector removably connected to said movable downhole assembly, said connector having a hooked device for grabbing an underside of said upper portion around a perimeter of said lower portion to dislodge said standing valve from said downhole pump barrel via an upward movement of said movable downhole assembly and said coupler.

20. A standing valve retrieval tool, comprising:

a lower portion having a lower end and an upper end;

said lower end of said lower portion having a lower threaded opening extending therein for threaded connection to a standing valve;

said lower portion having a lower exterior diameter;

an upper portion having a lower end and an upper end;

a plurality of depressions extending within an exterior surface of said upper portion;

said lower end of said upper portion linearly extending from said upper end of said lower portion;

said upper portion having an upper exterior diameter, wherein said upper exterior diameter is greater than said lower exterior diameter;

said upper end of said upper portion having an upper threaded opening extending therein for threaded connection to a first connector; and a shoulder defined along said lower end adjacent a peripheral edge of said upper portion, wherein said shoulder is perpendicular to a vertical axis of said upper portion and wherein said shoulder is adapted to retain a second connector thereunder.

* * * * *